May 31, 1966 G. F. ROGERS ET AL 3,254,241

SYMMETRICAL CLIPPING CIRCUIT EMPLOYING TRANSISTOR SATURATION AND DIODE CLAMPING

Filed Oct. 1, 1962

INVENTORS
GORDON F. ROGERS &
BY FREDERICK A. BARTON

George T. Craig
ATTORNEY 3,254,241

SYMMETRICAL CLIPPING CIRCUIT EMPLOYING TRANSISTOR SATURATION AND DIODE CLAMPING

Gordon F. Rogers, Moorestown, N.J., and Frederick A. Barton, Canonsburg, Pa., assignors to Radio Corporation of America, a corporation of Delaware Filed Oct. 1, 1962, Ser. No. 227,455
3 Claims. (Cl. 307—88.5)

The present invention relates to clipping circuits, and more particularly to a novel clipping circuit useful for symmetrically limiting signals such, for example, as voice frequency signals in the preparation of such signals for feeding a phase or frequency modulator.

An object of the preesnt invention is to provide a novel clipper.

Another object of the present invention is to provide a novel clipper which accomplishes clipping by the combination of a transistor and a diode.

A further object of the preesnt invention is to provide a novel clipper which accomplishes substantially symmetrical clipping by the combination of a transistor and a diode.

A still further object of the present invention is to provide novel means for processing a voice frequency signal prior to its use as a modulating signal.

The clipping circuit of the present invention is stable and of low cost. In accordance with the present invention, a transistor and a diode are associated in a novel manner to provide clipping in both directions of signal excursions. If desired, substantially symmetrical clipping may be readily obtained by the present invention. The transistor accomplishes clipping for a signal change in one direction and the diode clips the signal for a change in the opposite direction. The invention is especially applicable to clipping voice signals so as to prevent overmodulation of a carrier and is shown in this setting in the accompanying drawing.

Figure 1:
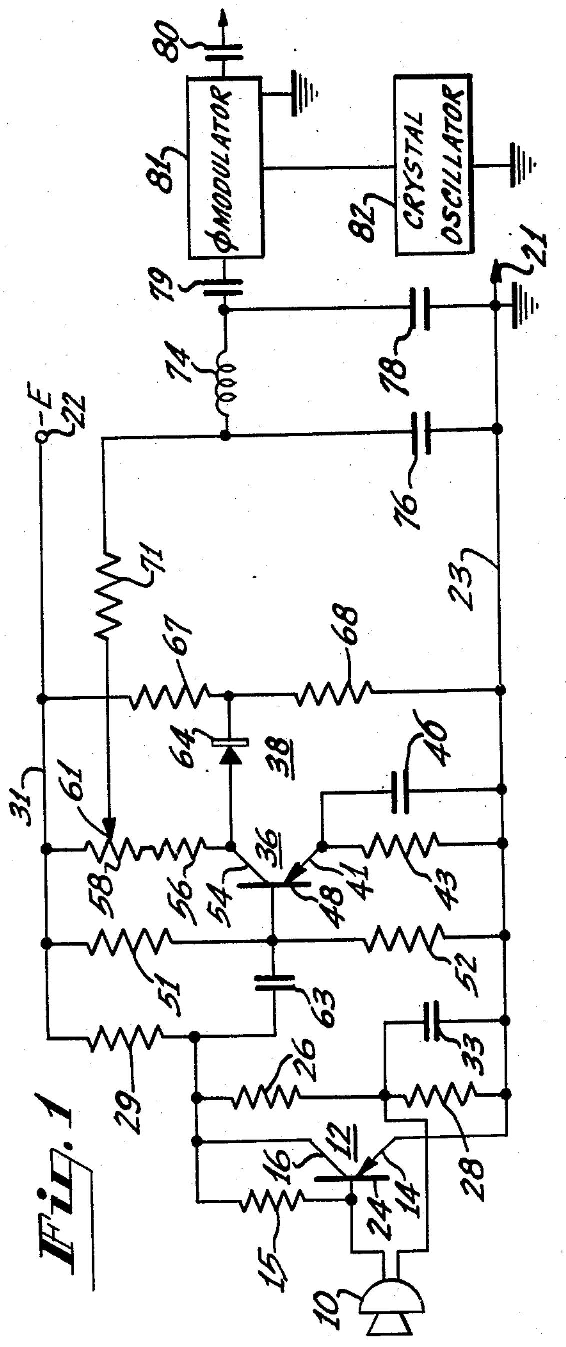
Figure 2:
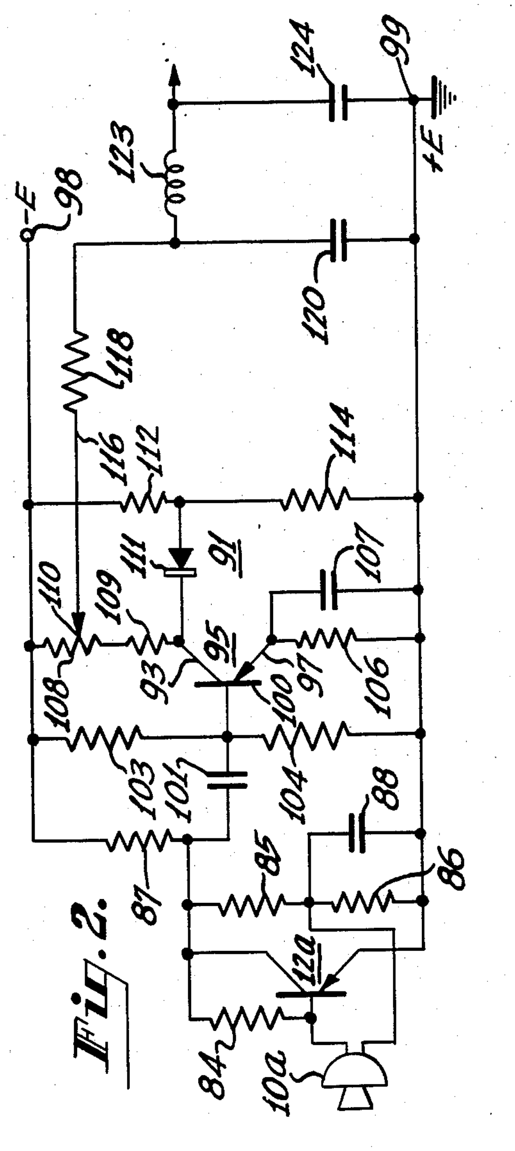

The invention will be described in greater detail by reference to the accompanying drawing in which:

FIGURE 1 is a schematic circuit diagram of a phase modulator system embodying the substantially symmetrical clipping circuit of the preesnt invention; and FIGURE 2 is a schematic circuit diagram of a modification of the symmetrical clipping circuit of FIGURE 1.

Referring to FIGURE 1 of the drawing, the output of an audio frequency source, shown by way of example as a microphone 10, feeds a preamplifier transistor 12. The emitter 14 and collector 16 of the transistor 12 are biased by a voltage source (not shown) having its positive terminal connected to the terminal 21 and its negative terminal connected to the terminal 22. In the illustrative example terminal 22 is 18 volts negative with respect to terminal 21. The terminal 21 and a conductor 23 serving as the positive bus, may be connected to a voltage reference point in the system, such, for example, as ground. A voltage divider comprising resistors 26, 28 and the resistor 29 connected in series between the positive bus 23 and a conductor 31 serving as the negative bus provides negative bias for the base 24 of the transistor 12. The mircophone 10 is connected from the base 24 to the junction of resistors 26 and 28. A stabilizing resistor 15 is connected between the base 24 and the junction of the resistors 26 and 29. The resistor 28 is bypassed by a capacitor 33. Operating voltage for the collector 16 is provided through the resistor 29.

The symmetrical clipping circuit of the present invention comprises a transistor 36 and a diode 38. The emitter 41 has a negative bias with respect to the bus 23 by way of a resistor 43 bypassed by a capacitor 46. Forward bias for the base 48 with respect to the emitter 41 is provided by resistors 51 and 52 connected in series between the buses 23 and 31. The collector 54 is connected to the bus 31 through a load resistor 56 and potentiometer resistor 58. These two resistors serve as the load resistor for the transistor 36 and the output, adjustable as to gain, is taken from the slider 61 on the potentiometer resistor 58.

The output from the transistor 12 is applied between the base 48 and emitter 41 of the transistor 36 by way of a coupling capacitor 63. The values of the resistors 51 and 52 and the resistor 43 are so selected that as the input signal goes positive beyond a predetermined limit clipping occurs due to base-to-emitter cutoff.

The cathode 64 of the diode 38 is biased by resistors 67 and 68 connected between the buses 23 and 31 so that as the signal at the collector 54 goes positive during a negative signal excursion on the base 48, the diode conducts and limits a further positive excursion. Conduction of the diode is determined in part by the relative value of the resistors 67 and 68.

A resistor 71 and capacitor 76 in series have a low pass filter function and are in the output path from the clipping circuit to a second low pass filter composed of an inductor 74 and a shunt capacitor 78 and, also, the capacitor 76. The output of the second low pass filter is fed to a modulator 81 which phase modulates the output of a crystal oscillator 82. This output connection may include a coupling capacitor 79. The output of the modulator is fed to RF (radio frequency) amplifiers and frequency multipliers (neither shown), for example by way of a coupling capacitor 80.

By way of example, the transistor 12 in FIGURE 1 of the drawing is type 2N109. The transistor 36 is type 2N270 and the diode 38 is type 1N34A.

In operation of the clipper circuit of FIGURE 1, as the input signal applied by way of the capacitor 63 swings in the positive going direction beyond a predetermined level, base to emitter cutoff occurs which limits the negative going swing of the amplified signal at the collector 54. As the input signal swings in the negative going direction also beyond a second predetermined level the positive going amplified signal at the collector 54 raises the positive voltage at anode of the diode 38 so that the diode conducts. This limits the positive level of the signal at the collector 54.

In the modified symmetrical clipping circuit of FIGURE 2 of the drawing, the cathode 111 of a diode 91 is connected directly to the collector 93 of a transistor 95. As in FIGURE 1, the emitter 97 and the collector 93 of the transistor 95 are biased from terminals 98 and 99, the terminal 98 being negative with respect to the terminal 99. Forward bias for the base 100 with respect to the emitter 97 is provided by resistors 103 and 104 connected as a voltage divider between the terminals 98 and 99.

Input from a signal source may be applied between the base and emitter of the transistor 95 by way of a coupling capacitor 101. As in FIGURE 1, the signal source connected to the capacitor 101, which corresponds to the capacitor 63, may be a microphone 10*a*, the output of which is amplified by a preamplifier transistor 12*a*. Resistors 84, 85, 86 and 87 serve the same purpose as the resistors 15, 26, 28 and 29, respectively, of FIGURE 1. The resistor 86 is shunted by a capacitor 88.

A negative bias with respect to terminal 99 is applied to the emitter 97 by a ressitor 106 bypassed by a capacitor 107 and connected to the terminal 99. A potentiometer resistor 108 and a resistor 109 are serially connected between the terminal 98 and the collector 93. This applies a reverse bias to the collector with respect to the base. The anode of the diode 91 is biased by a connection to the junction of resistors 112 and 114 connected between the terminals 98 and 99. The respective value of the resistors is such that the diode conducts when the collector voltage becomes more negative.

Output is taken from the slider 110 of the potentiometer resistor 108 over a conductor 116. The output may be filtered by the low pass filter composed of a resistor 118 and a capacitor 120 followed by a second low pass filter composed of an inductance 123 and a capacitor 124, and, also, the capacitor 120.

In operation of the symmetrical clipping circuit of FIGURE 2, as the input at the capacitor 101 swings in a negative direction, clipping occurs at the base 100 of the transistor 95 due to the decrease in base to emitter diode resistance. Further clipping results as the collector current is increased, since the collector voltage decreases to the point where collector bottoming or saturation occurs. On positive going input to the base 100, the collector current decreases and the collector voltage goes negative until the diode 91 becomes biased in the forward direction causing diode conduction and clamping at the voltage level supplied to the anode of the diode. The latter is set by a choice of the respective values of the resistors 112 and 114.

By way of example, the transistors **12*a* and 95 and the diode 91 may be of the same types as the examples given for the transistors 12 and 36 and the diode 38**, respectively, for FIGURE 1.

By way of example, the capacitors of FIGURE 2 may have the following values:

| | Mfd. |
|---|---|
| Capacitor **107** | 50 |
| Capacitor **101** | .053 |
| Capacitor **120** | 1 |
| Capacitor **124** | .047 |

Also, by way of example, the resistors may have the following values:

| | Ohms |
|---|---|
| Resistor **103** | 5.1K |
| Resistor **104** | 1.6K |
| Resistor **112** | 1.2K |
| Resistor **114** | 2.7K |
| Resistor **84** | 56K |
| Resistor **85** | 22K |
| Resistor **86** | 1K |
| Resistor **87** | 2K |
| Resistor **109** | 6.2K |
| Resistor **108** | 1.0K |
| Resistor **106** | 6.8K |

In FIGURES 1 and 2, NPN type transistors can be used if polarity of the bias voltages are reversed and the diodes are reversed by interchanging their cathode and anode connections.

What is claimed is:

1. A clipping circuit comprising a transistor amplifier, means to apply an input signal to said amplifier having excursions of signal magnitude in two directions, an output circuit for said amplifier, means to bias said amplifier, said biasing means providing clipping of the output signal by saturation in said output circuit upon input signal excursions exceeding a predetermined level in one direction of magnitude, a diode directly coupled to said output circuit, means for applying a biasing voltage to said diode, said diode being connected in the direction to conduct upon said input signal excursion in the opposite direction of magnitude exceeding a predetermined level whereby said diode clamps said output circuit to said bias voltage and clips said output signal.

2. A clipping circuit comprising a transistor amplifier, a signal input circuit and a signal output circuit for said amplifier, means to bias said amplifier, said biasing means providing clipping of the output signal by saturation in said output circuit upon input signal excursions exceeding a predetermined value in the negative-going direction, a diode directly coupled to said output circuit, means for applying a biasing voltage to said diode, said diode being connected in the direction to conduct upon said input signal excursion in the positive-going direction of magnitude exceding a predetermined level whereby said diode clamps said output circuit to said bias voltage and clips said output signal.

3. A clipping circuit comprising a transistor having base, emitter and collector electrodes, means to forward bias said base electrode with respect to said emitter electrode, means to reverse bias said base electrode with respect to said collector electrode, means to apply an input signal having positive and negative excursions between said base electrode and said emitter electrode, said means for biasing said base with respect to said collector saturating said transistor upon negative excursions of said input signal exceeding a predetermined value and thereby providing clipping of the corresponding positive excursions of the signal at the collector, a diode having a cathode and anode, means coupling said cathode directly to said collector electrode, means biasing said anode, said diode biasing means providing corresponding direct clipping of the negative excursions of said signal at said collector by conduction of said diode upon said corresponding positive excursions of said input signal at said transistor exceeding a predetermined level.

References Cited by the Examiner

UNITED STATES PATENTS

| | | | |
|---|---|---|---|
| 2,851,604 | 9/1958 | Clapper | 307—88.5 |
| 2,878,398 | 3/1959 | Peterson | 307—88.5 |
| 2,997,603 | 8/1961 | Isabeau | 328—171 |
| 3,041,541 | 6/1962 | Gerr | 307—88.5 |
| 3,089,964 | 5/1963 | Bruce et al. | 307—88.5 |
| 3,107,307 | 10/1963 | Sheffet | 307—88.5 |
| 3,163,828 | 12/1964 | Fine | 330—29 |

OTHER REFERENCES

Department of Army Technical Manual TM 11–690 "Basic Theory and Application of Transistors," March 1959, pages 197–198.

Electronic and Radio Engineering, by F. E. Terman, fourth edition, 1955 (pages 618–621).

"Pulse and Digital Circuits," by Millman and Taub, McGraw-Hill Book Company, Inc., © 1956, pages 562–4.

ARTHUR GAUSS, *Primary Examiner.*

GEORGE N. WESTBY, *Examiner.*

J. ZAZWORSKY, *Assistant Examiner.*